United States Patent [19]

Fowler et al.

[11] 4,294,162
[45] Oct. 13, 1981

[54] FORCE FEEL ACTUATOR FAULT DETECTION WITH DIRECTIONAL THRESHOLD

[75] Inventors: Donald W. Fowler, West Haven; Douglas H. Clelford, Trumbull, both of Conn.

[73] Assignee: United Technologies Corporation, Hartford, Conn.

[21] Appl. No.: 60,093

[22] Filed: Jul. 23, 1979

[51] Int. Cl.³ .................. F15B 13/14; F15B 13/16
[52] U.S. Cl. ......................... 91/434; 91/361; 91/363 A; 91/390; 91/437; 244/223
[58] Field of Search ............ 91/434, 437, 361, 363 R, 91/363 A, 370, 390; 244/83 D, 178, 196, 197

[56] References Cited

U.S. PATENT DOCUMENTS

| | | | |
|---|---|---|---|
| 2,530,659 | 11/1950 | Hill | 91/370 |
| 2,940,699 | 6/1960 | Plummer | 244/83 D |
| 3,463,423 | 8/1969 | Wong et al. | 244/83 D |
| 3,568,572 | 3/1971 | Steinmetz | 91/361 |

Primary Examiner—Paul E. Maslousky
Attorney, Agent, or Firm—M. P. Williams

[57] ABSTRACT

In a system which provides feel-force to the control stick of an aircraft by means of hydraulic pressure, a fault indicating system which responds to excessive differences between desired and actual force in the actuator, only of a polarity in the same direction as concurrent stick motion, to separate pilot induced pressure excesses from force-system faults, is provided with directional sensitivity in the fault-indicating output logic. Excessive pressure errors in either direction of stick travel institute the monitoring of changes in stick position. Changes in stick position of an excessive magnitude are recognized as fault only if they occur in the same direction as the direction of excessive pressure error. A simple analog embodiment utilizes threshold detectors and a track store device; a dedicated-digital embodiment utilizes comparators, registers and a subtractor; and a computer embodiment utilizes a software routine.

4 Claims, 6 Drawing Figures

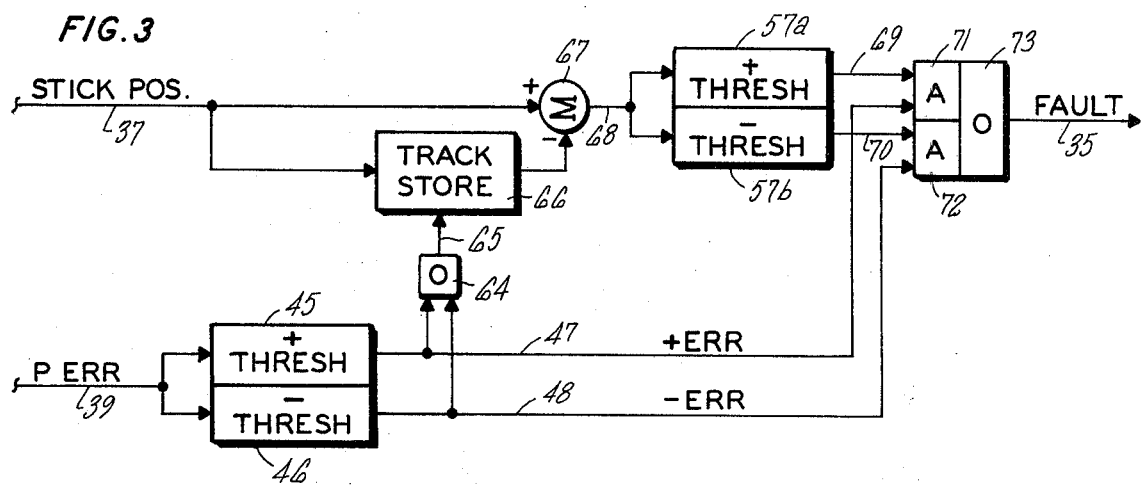
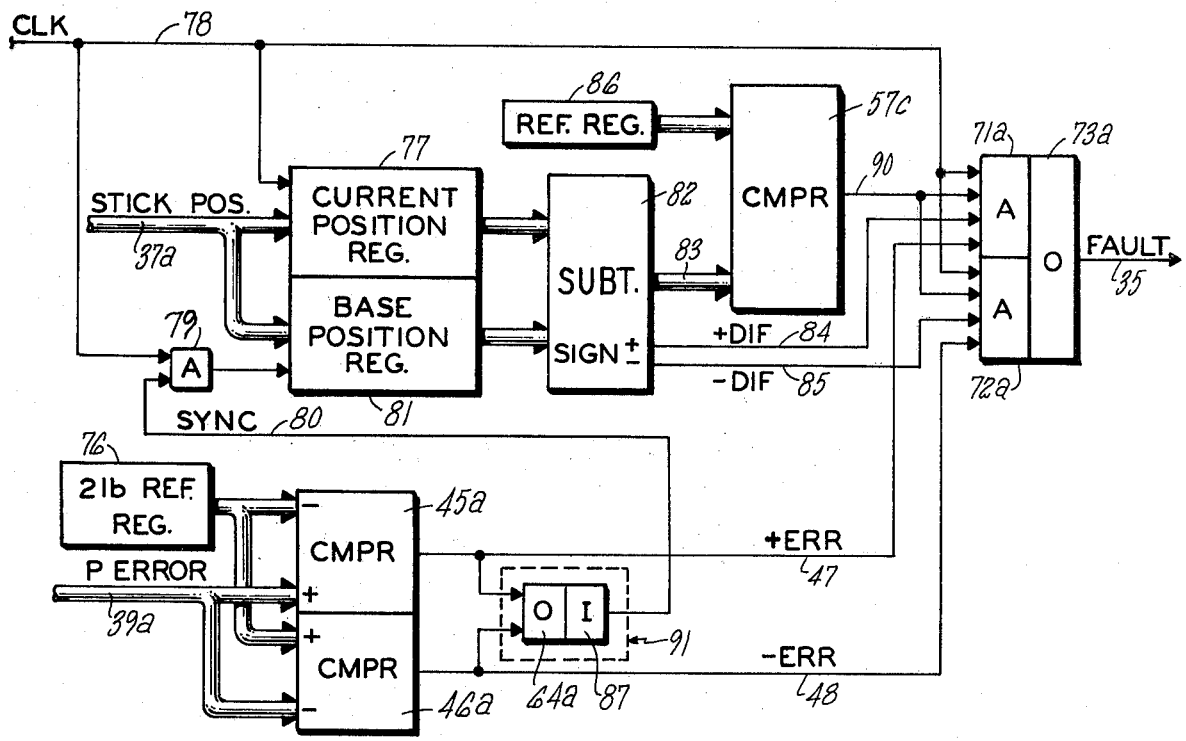
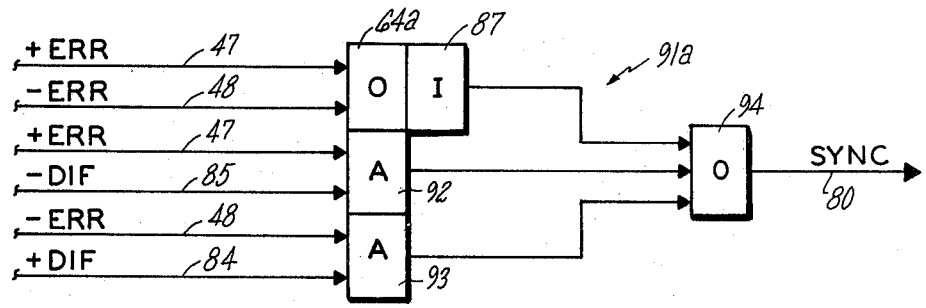

FORCE FEEL ACTUATOR FAULT DETECTION WITH DIRECTIONAL THRESHOLD

The Government has rights in this invention pursuant to Contract No. N00019-75-C-0267 awarded by the Department of the Navy.

BACKGROUND OF THE INVENTION

1. Field of Art

This invention relates to systems which induce feel-force in aircraft control sticks by means of hydraulic pressure, and more particularly to improvements in detecting faults in the operation of such systems.

2. Description of the Prior Art

For some time, it has been known to utilize hydraulic actuators connected to the linkage of an aircraft control stick to provide force to the control stick which is dependent in some fashion upon the position of the stick, to indicate to the pilot the degree of command caused by him, which in turn is an indication of the loading of the aircraft surfaces.

Because there is a possibility that such a hydraulic actuator can move the control mechanisms accidently, in a fashion to cause undesirable or catastrophic flight maneuvering, it has been known to provide fault detection apparatus for hydraulic feel-force systems. One fault detection apparatus known to the prior art compares the force output of two actuators in a pair of completely separate force augmentation systems; divergence between the two, in excess of a threshold magnitude, indicates failure. However, such apparatus is extremely costly and excessively heavy, to a degree which may be unacceptable. A second fault detection apparatus simply monitors the force-related pressure of the actuator, and if it exceeds a given magnitude for a certain period of time, the system is shut down. However, this system is highly susceptible to nuisance shutdown as a consequence of abrupt pilot-induced motion to the stick causing high pressure differences across the actuator. And, the sophisticated modifications added to such system, to cause it to operate in an acceptable manner, provide cost and weight penalties similar to those of the system described hereinbefore.

To overcome these difficulties, a fault detection system having a certain degree of direction sensitivity has been devised. In this system, stick motion in the same direction as an excessive pressure (proportional to force) error in the force actuator is monitored, and when such stick motion exceeds a threshold value, the system is shut down. This system is described fully in the detailed description, hereinafter. This system has fewer, less significant problems than those described hereinbefore. But, it requires a balance between nuisance shutdowns as a consequence of long term drift on the one hand, and insensitivity to slow, fault-generated stick motions which are masked by drift compensation, on the other hand. Also, the threshold detecting of a magnitude of error indicative of fault is done in a single polarity domain (positive or negative) following integration of signals in that single domain, based either on non-inverted signals of one polarity or inverted signals of another polarity. Thus the thresholding to detect fault is not directionally sensitive. Because this detecting apparatus utilizes nonlinear integration following differentiation, unequal integration of noise can result in nuisance shutdowns and other problems. The circuitry necessary to actually implement such an apparatus in the technological real world becomes expensive and complex, as well. These factors are discussed more fully following a general description of this prior art fault detection apparatus, in the detailed description, hereinafter.

SUMMARY OF THE INVENTION

Objects of the invention include improvements in hydraulic force feel actuator fault detection systems.

According to the present invention, excessive errors between desired force and generated force in a given direction in a hydraulic force feel actuator system are used to respond to a related one of a pair of direction-assigned thresholds, each of which is indicative of excessive changes in stick position only in the same direction as the corresponding direction of force error.

The invention avoids the use of differentiators and integrators; accumulation of error of one direction with error of the other direction is impossible. The establishment of tight tolerances, with a minimum of nuisance shutdowns is easily achieved. The apparatus may be implemented in a variety of non-complicated fashions, keeping cost and weight at a minimum. The invention may be implemented in analog, digital or computer software form, utilizing only technology which is readily available.

The foregoing and other objects, features and advantages of the present invention will become more apparent in the light of the following detailed description of exemplary embodiments thereof, as illustrated in the accompanying drawing.

BRIEF DESCRIPTION OF THE DRAWING

FIG. 3 is a simplified schematic diagram of a general embodiment of fault detection apparatus in accordance with the present invention;

FIG. 4 is a simplified block diagram of a digital embodiment of a fault detection apparatus in accordance with the invention;

FIG. 5 is a simplified block diagram of alternative synchronizing circuitry for use in the embodiment of FIG. 4.

DETAILED DESCRIPTION

System (Prior Art)

Figure 1:
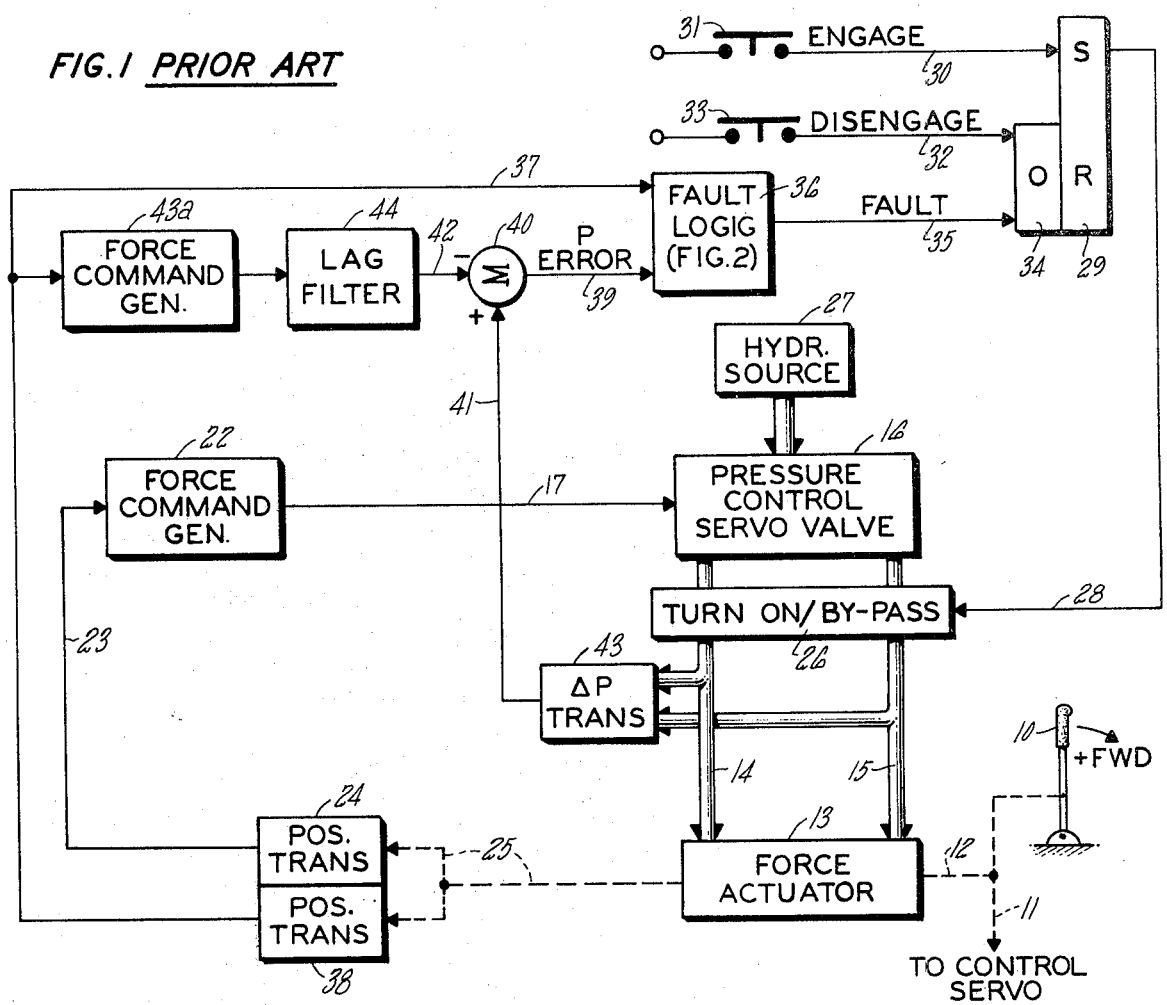
FIG. 1 is a simplified block diagram of a hydraulic force feel system known to the prior art.

Referring now to FIG. 1, a force augmentation system (FAS) recently introduced to the prior art utilizes hydraulic force to provide feel to the control stick 10 of an aircraft, which for exemplary purposes herein is assumed to be the pitch (longitudinal) axis of the cyclic pitch stick of a helicopter.

The stick 10 is provided with mechanical connections 11 to a control servo which include connections 12 to a force actuator 13 which provides a force in either a plus (nose down) or minus (nose up) direction to the stick 10 in response to the difference in hydraulic pressure applied thereto on hydraulic lines 14 and 15, under the control of a pressure control servo valve 16. The servo valve 16 provides a pressure difference between the lines 14 and 15, depending upon the desired magnitude and direction of force, under control of a force command signal on a line 17 generated as a function of stick position by a force command generator 22 which may, for instance, be of the type disclosed in U.S. Pat. No. 3,733,039, or it may be of other suitable types, one of which is described with respect to FIG. 6 hereinafter. The force command generator is responsive to a stick position signal on a line 23 which is provided by a position transducer 24 which has mechanical connection 25 through the force actuator 13, and other mechanical connections, to the cyclic stick 10.

The servo valve 16 receives hydraulic fluid under pressure from a source of hydraulic fluid under pressure 27 and applies pressure signals through a FAS turn-on bypass valve 26 to the actuator 13. Although not shown, the hydraulic system includes hydraulic return lines, in the well known fashion.

The pressure control servo valve 16 may be of the type disclosed in U.S. Pat. No. 3,862,730. The turn-on valve either connects the servo valve 16 to the force actuator 13, or it disconnects it, and provides bypassing between the lines 14, 15 so as to provide hydraulic damping to the force actuator 13 when the FAS system is disengaged. The turn-on valve is caused to engage and provide the hydraulic actuator force by means of a turn-on signal on a line 28 which may be provided in any suitable way, such as by a bistable device or latch 29 which can be placed in the set state, so as to turn on the FAS system by means of an engage signal on a line 30, such as by connecting a suitable voltage source through a momentary contact switch 31, in a well known fashion. Similarly, a disengage signal on a line 32, provided by a momentary contact switch 33, can operate an OR circuit 34 to reset the bistable device 29 and thereby turn the FAS system off.

The foregoing completes a description of a hydraulic FAS system; the remainder of FIG. 1 relates to detection of faults, either electrical or hydraulic, in the FAS system, which could allow the actuator 13 to drive the linkage 11, 12 in a manner to maneuver the aircraft in an undesirable or unsafe fashion.

In response to detected faults, the OR circuit 34 is additionally responsive to a fault signal on a line 35 which is provided by fault logic 36. The fault logic 36 is, in the prior art, of the type described hereinafter with respect to FIG. 2. This is responsive to a stick position signal on a line 37 which is provided by a redundant stick position transducer 38, and is also responsive to a pressure error signal on a line 39 which is provided by a summing amplifier 40 in response to a pressure difference signal on the line 41 and a filtered model force command signal on a line 42. The pressure error signal on line 39 is proportional to the force error in the servo valve 16. The pressure difference signal on the line 41 is generated by a pressure difference transducer 43 in response to the difference in pressure in the lines 14, 15. The model force signal on the line 42 may be a filtered version of the desired force signal on the line 17, or it may be provided by a redundant force command generator 43a, which generates a command (essentially the same as that of the force command generator 22) which is thereafter passed through a lag filter 44. The lag filter 44 simply causes the model force signal on the line 42 to be somewhat corrected for the real-world dynamics of the force actuator hydraulic system so as to provide a better match between the pressure error signal on the line 39 and the actual conditions in the force actuator which are being monitored.

Fault Logic (Prior Art)

Figure 2:
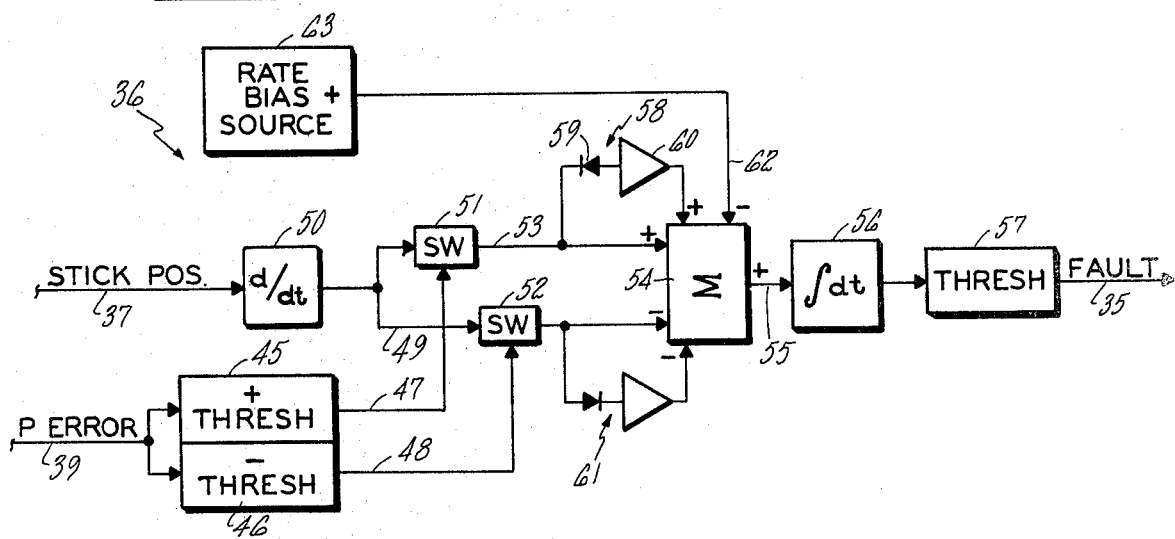
FIG. 2 is a simplified schematic diagram of fault detection logic of the prior art, useful in the system disclosed in FIG. 1.

Referring now to FIG. 2, the prior art fault logic 36 is direction discriminative, as is described briefly hereinbefore. Specifically, the pressure error signal on the line 39 is applied concurrently to a positive threshold circuit 45 and a negative threshold circuit 46 which provide respective signals on corresponding lines 47, 48 when the pressure error exceeds some threshold value, about 10% of the total force the actuator can apply, in the positive or negative direction, respectively. The one of the lines 47, 48 having a signal on it, or the fact that neither has a signal on it, controls the operation of the fault logic circuitry so as to achieve the direction discrimination referred to hereinbefore. If there is a signal on the line 47, that means that there is a significant pressure error in the forward or nose-down direction; on the other hand, a signal on the line 48 is indicative of a significant pressure error in the minus or nose-up direction.

A signal indicating the stick velocity is provided on a line 49 by a differentiator 50 which is responsive to the stick position signal on the line 37. The polarity of the signal on the line 49 is indicative of the direction in which the stick is moving. Velocity of the stick in the same direction as the pressure error indicates that the actuator is forcing the stick 10 and the mechanical linkages 11, 12 (etc.) and that a dangerous condition therefore exists. But, velocity of the stick in a direction opposite to the direction of the pressure error indicates rapid motion by the pilot, with the actuator trying to keep abreast with appropriate opposing force. The signals on the lines 47, 48 operate corresponding switches 51, 52 (which may simply be field effect transistors or other signal-actuated switches) so that the fault logic is principally sensitive to the rate of change of stick position only in the same direction as the pressure error. Thus if the stick is moving forward and there is a positive (forward) pressure error, the switch 51 will apply a positive signal on a line 53 which is applied to a non-inverting input of a summing amplifier 54 to provide a signal on a line 55 to an integrator 56. The integrator 56 will integrate the stick velocity after operation of the switch 51. The magnitude of the output of the integrator 56 is thus indicative of actual stick motion which is probably caused by the force actuator 13, since it indicates stick motion in the same direction as the pressure error (that is, a differential pressure between the lines 14 and 15, FIG. 1, which is excessive compared to the command signal being provided thereto. The magnitude of the output of the integrator 56 is monitored by a threshold detector 57, and when the stick has moved some amount (which may be on the order of 3% of full pilot authority) it will provide the fault signal on the line 35, which (in FIG. 1) will cause the OR circuit 34 to reset the FAS engage latch 29, and thus turn off the valve 26 and cause it to go into a bypass mode.

Assuming that a negative pressure error is detected, and that the stick is moving in a negative (nose up) direction, the switch 52 will allow negative signals on the line 49 to be applied to an inverting input of the summing amplifier 54 to provide a positive signal on the line 55, and operation is the same as has been described with respect to positive errors.

Assuming a positive pressure error, which causes the switch 51 to operate, if the stick is moving in the negative direction, this means that the pilot is rapidly driving the stick negatively, and the force actuator is being hard-driven to try to catch up to the pilot. With the switch 51 actuated and a negative signal on the line 49, a negative signal is applied on the line 53. The negative signal on line 53 is not inverted in the summing amplifier 54 so it applies a negative signal on the line 55. The integrator 56 is unilateral, integrating only in a positive direction. So the signal on the line 55, being negative, has the effect of holding the integrator on its negative limit. Similarly, if the stick is moving in the forward direction but there is a negative pressure error, the switch 52 will provide a positive signal at an inverting input of the summing amplifier 54, which causes a negative signal on the line 55 to which the integrator 56 is insensitive.

If there is a positive rate of change of stick position and a positive error, so that the switch 51 applies a positive signal on the line 53 to the non-inverting input of the summing amplifier 54, the integrator will begin integrating stick position as described hereinbefore. If, however, the stick is then moved in the negative direction, while the positive pressure error continues, this indicates that the system is working itself away from a dangerous condition, and there is no need to indicate a fault. In this situation, once the signal on the line 53 changes from a positive signal to a negative signal, the integrator 56 is, essentially, reset because the negative signal on the line 53 will pass through a unilateral high gain circuit 58, which may comprise a diode 59 and a high gain amplifier 60, to provide a very large negative signal on a non-inverting input of the summing amplifier 54, which in turn provides a large negative signal on the line 55 to drive the integrator back to zero (in the positive domain). Similarly, a signal passing through the switch 52, if changed from negative to positive, will be applied to an inverting input of the summing amplifier 54 by a high gain unilateral path 61, to provide a large negative signal which restores the integrator 56 to zero. The paths 58, 61 are ineffective in situations in which the switches 51, 52 are engaged with stick velocity opposite to the pressure error initially, since the integrator 56 is biased to be operative only in the positive domain, as described hereinbefore.

The circuit of FIG. 2 has been found to provide a reliable FAS fault detection function with elimination of substantially all nuisance faults and the ability to have fairly tight thresholds on faults which are desired to be detected. However, the actual physical implementation of the circuit of FIG. 2 has presented some difficulties. First, it requires a non-symmetrical integrator 56. The circuitry provided as accessories to a summing, integrating amplifier in order to render it unilateral (operative in only the positive or negative domain, as the case may be) tends to render the circuit very complex and causes it to become somewhat nonlinear. The nonlinearity not only provides different response characteristics depending upon the polarity of direction of fault being detected, but also causes unequal integrating response to noise which is amplified in the differentiator 50. Thus, transients are a problem unless the combination of the summing (54) and integrating (56) functions are rendered symmetrical and relatively linear when considered in contrast with the signals applied to the summing junction input. Because of the need for the various inverting and non-inverting inputs and the need for symmetrical linearity in the overall function, it has been found necessary to provide additional amplifier stages in order to achieve circuitry which operates as desired.

Because of the fact that there is a great propensity for biasing and drifts of various kinds, the circuitry of FIG. 2 has been found to be extremely sensitive to both hydraulic and electric drifts that could cause nuisance indications of fault when none existed. In order to offset the effect of these biases, a bias signal on a line 62 is provided from a rate bias source 63. However, when this is done, the circuitry of FIG. 2 is totally insensitive to very slow changes in stick position caused by faults.

The integrator 56 has as inherent accumulation, or memory, function which requires resetting (restoring to zero) between successive potential faults that it tracks. The high gain unilateral paths 60, 61 will accommodate this need adequately for high rates of stick motion. However, the forward bias diode drop (on the order of one-half volt) must be overcome before reset action is initiated. Thus, slow inverse rates (on the order of 10% of maximum stick velocity, or less) will not cause restoring of the integrator.

Further, the integrator 56 accumulates all potential fault indications in the positive domain, regardless of fault direction. The threshold detector 57 can thus respond to the summation of nuisance fault indications (e.g noise) in both directions. And, it is conceivable that the integrator could have substantially reached the threshold to indicate a fault based upon non-inverted positive stick velocity, the pressure difference could change abruptly, and the direction of stick velocity (to drive it to a normal position) would integrate in the same direction. Even though the stick were heading back toward a safe condition, the integrator could continue to integrate inverted negative velocity signals and thereby cause a nuisance fault.

Fault Logic—Embodiments of the Invention

A simple embodiment of the present invention, which overcomes the circuit difficulties of the prior art, is illustrated in FIG. 3. Therein, the plus and minus pressure error signals on the lines 47 and 48 are used, alternatively, to drive an OR circuit 64 to provide a store signal on a line 65 that causes a sample and hold or track store circuit 66 to memorize stick position from the stick position signal on the line 37, whenever excessive pressure error is detected in either direction. The output of the track store circuit 66 is applied along with the stick position signal on the line 37 to a summing amplifier 67, the output of which on a line 68 is a signal having a magnitude indicative of the stick position increment which has occurred since excessive pressure error has been sensed. When this increment of stick position gets high enough, either of two threshold detectors 57a, 57b, depending upon polarity, will provide an output signal on a corresponding line 69, 70 to a related AND circuit 71, 72. The directional discrimination in this circuit is achieved at the gates 71, 72, since an excessive position change in a given direction is recognized as a fault (that is as being caused by the force actuator rather than by the pilot) only when the excessive stick position is in the same direction as the excessive pressure error, as is indicated on the corresponding lines 47, 48. If either of the AND circuits is operable because of concurrence of excessive stick position in the same direction as excessive pressure error, an OR circuit 73 will generate the fault signal on the line 35. Since a single time integral is not utilized in order to determine the stick position increment which accompanies an excessive pressure in either direction; and since stick position changes in one direction could not possible aid in operating the threshold detector for the opposite direction (due to the directionally independent thresholds), no fast catch-up circuitry (such as the unilateral high gain paths 58, 61 in FIG. 2) is required in the apparatus of FIG. 3.

On the other hand, anytime the pressure error changes from positive to negative (or vice versa) it will pass below the threshold sufficiently so that the OR circuit 64 will no longer provide the store signal, and allow the track store circuit 66 to track again, so that when pressure error direction changes, the track store device can track a new stick position before it can possibly be forced to store a new stick position. Thus, the circuit of FIG. 3 is extremely simple and relatively free of time functions of the signals involved, drift and the like. Depending upon the quality of the track store 66, it may have a droop as a function of time, but since the fault detector operates in fractions of a second, it should not be a significant problem in most cases.

In FIG. 4 there is shown a digital embodiment of fault logic which performs the fault logic function with the same principles as are employed in the embodiment of FIG. 3. In FIG. 4, the pressure error signal is assumed to be in digital format, either by virtue of receiving an output from a D/A converter or by virtue of use in a system (FIG. 1) which is basically digital in nature. This pressure error signal is provided to a pair of comparators 45a, 46a which is also fed by a reference word from a two pound reference register 76. The reference register 76 is equivalent to the biases provided in the threshold circuits 45, 46 in FIGS. 2 and 3. By connecting the reference register to an inverting input of the comparator 46a, the plus error and minus error signals on the lines 47 and 48 are generated in the same fashion. Being digital, the stick position signal on a plurality of lines 37a has to be sampled from time to time and stored in a current position register 77 in response to a clock signal on a line 78. Except when there is a pressure error, as indicated by one of the signals on the lines 47 and 48, an AND circuit 79 will be responsive to a synch signal on a line 80 to pass clock signals from the line 78 to a base position register 81. Thus the two registers 77, 81 both have a current stick position in them, at the sampling rate of the clock signal on the line 78, so long as the synch signal is present on the line 80. This is equivalent to the store signal on the line 65 being absent and allowing the track store circuit 64 to track the stick position, in the embodiment of FIG. 3. The two registers are connected to a subtractor 82 which provides a magnitude on a plurality of lines 83 and the sign of the difference on corresponding plus difference and minus difference lines 84, 85. The output of the subtractor on the lines 83 is supplied to a comparator 57c, the other input of which is provided by a reference register 86 which is equivalent to the biases in the threshold detectors 57 (FIG. 2) and 57a, 57b (FIG. 3).

Assuming that a high pressure error is sensed by one of the comparators 45a, 46a one of the lines 47, 48 will have an input so that an OR circuit 64a will cause an inverter 87 to cease generating the synch signal on the line 80. Thereafter the gate 79 is blocked so that no further clock signals are passed to the base position register 81. This is equivalent to the track store circuit 64 (FIG. 3) being forced into the store mode. Thereafter the output of the subtractor 82 will indicate the change in stick position which has occurred since the excessive pressure error was sensed, in the same fashion as the output of the summing amplifier 67 in the embodiment of FIG. 3. Assuming that the stick position increases in the same direction as the pressure error, indicating that the stick is being driven by the force actuator 13 (FIG. 1), the magnitude indicated on the lines 83 may be sufficient so that the comparator 57c will provide an output signal on a line 90 to each of two AND circuits 71a, 72a. One of the AND circuits will be operable depending upon the sign (plus difference, minus difference) indicated by one of the lines 84, 85 having a signal on it, if the stick position is moving in the same direction as the pressure error, since the AND circuits are correspondingly responsive to the plus error and minus error signals on the lines 47 and 48. The clock signal on the line 78 may also be applied to the AND circuits so that, at the start of each sampling period, fault is sampled by the AND circuits 71a, 72a based on the prior result (which doesn't change too rapidly as a consequence of gating in the new signals through the circuitry of the subtractor and the comparator).

It should be understood that the commonality between FIG. 3 and FIG. 4 is subtracting a base stick position (stored at the time that an excessive pressure error occurs) from current stick position, and comparing the incremental value of stick position change after that time with a threshold magnitude, as well as gating under control of direction, so as to determine when an excessive stick position has occurred in the same direction as an excessive pressure, and indicate a fault. This contrasts with the prior art circuit of FIG. 2 in that it does not depend upon stick position velocity, does not employ an integrator which is sensitive to drift and differentiator noise, as described hereinbefore, and it is not directionally insensitive in the thresholding of the stick position increment which has occurred following an excessive pressure error.

The OR circuit 64a and inverter 87 together comprise a synch generator 91 which blocks the base position register from being updated (causes it to store rather than to track) whenever a pressure error of either polarity is determined to be of excessive magnitude. It is possible that pilot-induced stick motion could cause this to happen, and that the pressure error could switch from one direction to another within a single clock period, such that the base position register would continue to store a stick position which related to a pressure error of one direction even though the pressure error has, since the last clock signal, shifted to the other direction. This could cause a nuisance (not actual) fault. Provided that the clock is relatively fast, and provided that the thresholds are tight, this should have no affect on the viability of the fault logic circuit of FIG. 4. In the event that a dangerous fault were occurring, the thresholds (which may be on the order of 10% of pressure and 3% of stick position following excess pressure) may be tight enough so that the fault would be manifested without regard to any attempt of the pilot to overcome the fault on the stick (and thereby cause stick position reversals or pressure changes as a consequence of pilot-induced stick motion).

In a case, however, where changes in stick direction or changes in pressure error after initial desynchronization of the base position register occur are important, a synch generator 91a illustrated in FIG. 5 may be used in place of the simple synch generator 91 illustrated in FIG. 4. In FIG. 5 an OR circuit 64a and an inverter 87 provide the same function of allowing synch to occur whenever neither of the comparators 45a, 46a provide an output signal indicating an excessive pressure error in either direction. Once an excessive pressure error is detected, however, if the difference in the current stick position and the base stick position is of a direction opposite to the pressure error (indicating that the pressure error is pilot-induced or has been overcome by the pilot), either of two AND circuits 92, 93 can provide a signal to an OR circuit 94 to generate a synch signal, even though the inverter 87 is not generating a signal. The embodiment of FIG. 3 is self-synchronous, so no synch signal of the type described in FIG. 5 is needed therein.

The embodiments illustrated in FIGS. 4 and 5 employ dedicated digital hardware. The same basic circuit philosophy may be implemented utilizing software control over multipurpose hardware (such as in a computer) as is described with respect to FIG. 6. Such an embodiment may be useful in a case where a digital force augmentation system is feasible, or where there is a digital flight control system in use. For instance, in a commonly owned copending application of Murphy and Clelford, Ser. No. 938,583, filed on Aug. 31, 1978, there is disclosed a twin computer automatic flight control system which represents portions of a system which has had a FAS fault logic function of the type illustrated in FIG. 6 implemented therein. For completeness, the relationship in which the fault detection of FIG. 6 may be implemented in the aforementioned copending application is described in some detail. However, it is not necessary to consider the manner in which the fault detection of FIG. 6 may be implemented in the system of said copending application in order for those skilled in the art to appreciate the software embodiment of the present invention. Referring now to figure numbers and reference numerals of the aforementioned copending application, there is disclosed in FIG. 2 thereof a servo-on valve 74 which is equivalent to the turn-on valve in FIG. 1 herein. And that servo-on valve may be disengaged by signals applied to an OR circuit 73 in response to either of the two computers disclosed therein. There is further disclosed a servo or latch 110 (which is equivalent to the latch 29 disclosed herein). In FIG. 5 there is a routine 519 "Pitch Force Augmentation Calculation A" and in FIG. 9 thereof there is a routine 904 "Pitch Force Augmentation Calculation B". These routines may provide the force command (equivalent to the force command generated in the circuits 22 and 43a in FIG. 1 hereof). Those force commands are outputted through a D/A converter 80 to control the coils of a pressure control servo valve, such as the one referred to in FIG. 2 of said application as valve 105 (which is equivalent to the servo valve 16 herein) for providing force augmentation to the control stick. The force commands so generated may also be utilized in a FAS fault routine of the type illustrated in FIG. 6 herein, such routine being performable, for instance, between the major fault subroutine 1020 and the increment autopilot counter subroutine 1021 illustrated near the bottom of FIG. 10 of said application.

Figure 6:
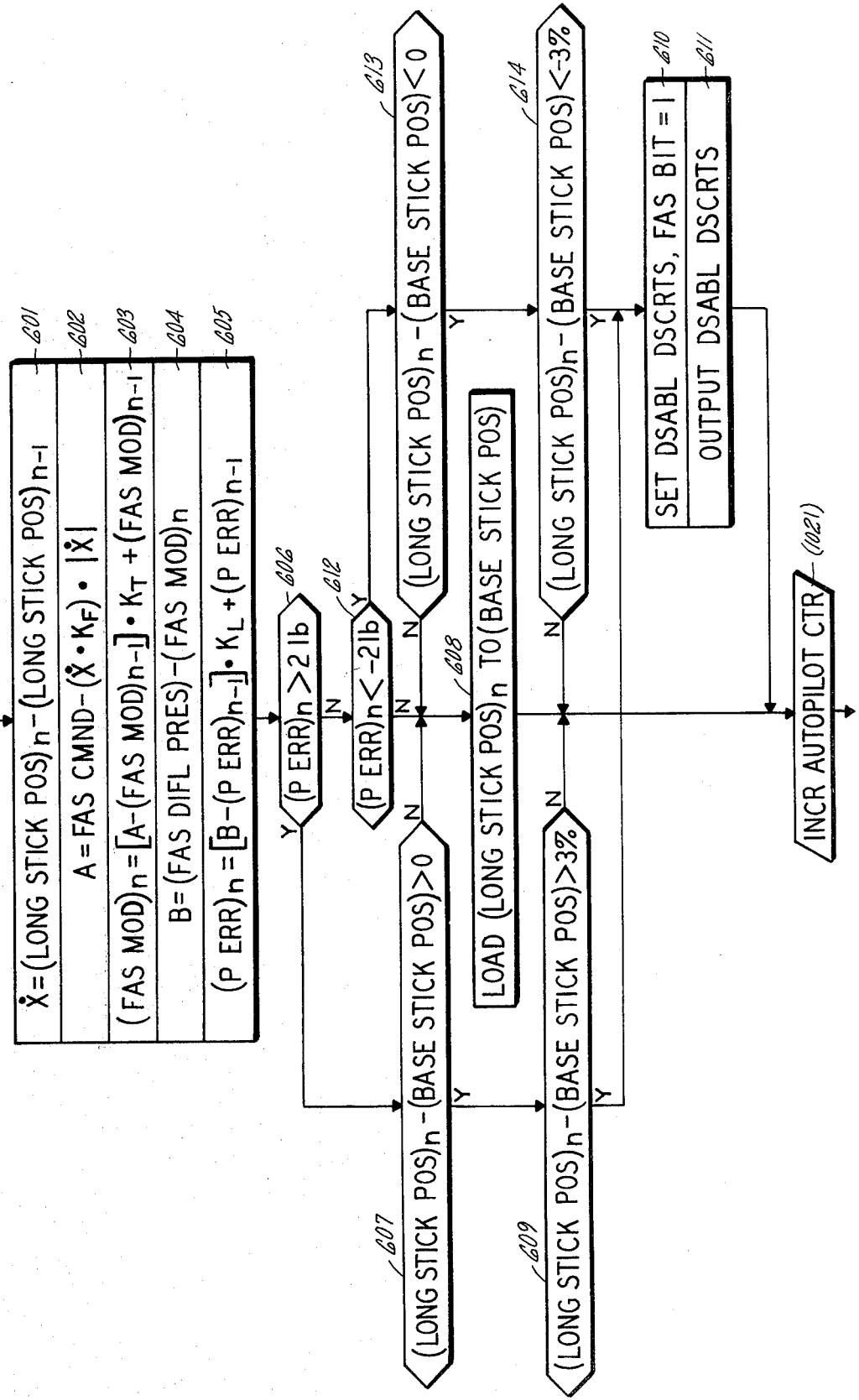
FIG. 6 is a logic flowchart illustrative of a program for carrying out the present invention in a computer embodiment.

Referring now to FIG. 6, entry into the FAS fault subroutine is achieved through an entry point 600. The equivalent of the pressure error signal on lines 39a in FIG. 4 is generated in the first part of this subroutine (or it could be in a subroutine performed prior to the FAS fault routine if desired). First a step 601 provides the difference ($\dot{x}$) in current stick position from the stick position of the next preceding cycle. Such stick positions may be provided by DMA controller data moves as is illustrated in the tables on page 28 of the aforementioned application, such as the first move in the table referred to as DMA Data Move Program-Macro Synch and the last move in the table referred to as DMA Data Move Program-Real Time 2, which are performed coextensively with the utility program as is illustrated in FIG. 3 of the aforementioned copending application. The longitudinal stick position (which is the pitch axis of the cyclic stick position utilized as the example herein) is periodically read from the stick position sensor through an A/D converter and into storage of both computers (although only one computer is referred to herein, and the use of dual computers is irrelevant to the present invention). In FIG. 6 herein, the next step is to generate an unfiltered model force command, A, as a function of the force augmentation calculation A or B of said copending application (which is referred to herein as FAS CMND); this provides the unfiltered model force command, A, as a function of the actual force command minus a constant times the signed-square of the stick position difference ($\dot{x}$), as illustrated in block 602. Then the model force signal is generated in block 603 by simply comparing the new unfiltered model force command of block 602 with the previous filtered force signal times a time constant and adding it to the previous value in the manner analogous to a leg filter. The pressure error is generated unlagged in block 604 and is lagged in a similar fashion in block 605, all of which are digital techniques, analogous to analog techniques, which are well known in the art.

The actual FAS fault determination begins with test 606 which is equivalent to the comparator 45a of FIG. 4. If the pressure error signal is greater than plus two pounds, test 607 determines whether there is a change in stick position in the same (positive) direction as the pressure error. If not, step 608 will update the base stick position to the new stick position. This is equivalent to tracking by the track/store circuit 66 (FIG. 3) tracking the stick position, and is equivalent to the gate 79 providing the clock pulse to update the base position register 81 in FIG. 4, in response to gate 92 (FIG. 5). But if the test 607 determines that there is stick motion in the positive direction (the same direction as the pressure error), then step 609 will determine whether this motion exceeds 3% of pilot authority (or some other suitable value which may be determined in any given implementation of the present invention). If not, the subroutine is exited. This is equivalent to the summing amplifier 67 in FIG. 3 providing a signal indicative of change in stick position to the threshold detector 57a in FIG. 3 without the threshold detector having tripped, and is equivalent to the subtractor 83 successively subtracting new values in the current position register 77 from the fixed position established in the base position register 81, without the comparator 57c providing an output, in FIG. 4. But if test 609 determines that there has been 3% stick motion in the positive direction, then step 610 will set a correct fault bit to ONE in a "disable discretes" word, and step 611 will output this corrected disable discretes word to cause turn off of the valve 26 (FIG. 1). In the aforementioned copending application, this may be achieved by passing the word established in step 611 of FIG. 6 herein across the disable discretes lines 61a in FIG. 2 of the copending application, the ONE on line 61a-3 (for instance) actuating the OR circuit 115 to reset the latch 110 so that the OR circuit 73 will no longer enable the servo-on valve 74. This is equivalent to the OR circuit 34 (FIG. 1 herein) resetting the latch 29 herein to disable the valve 26.

In FIG. 6 herein, if test 606 determines that there is not a positive pressure error in excess of two pounds, test 612 will determine whether the error is more negative than minus two pounds. If not, the stick position is synched by step 608 causing a new stick position to be loaded into a base stick position address and then the program is exited. But if there is an excess negative pressure, test 613 determines whether the stick position has moved in the negative direction; if not, step 608 will update the base stick position; but if so, test 614 determines whether the negative stick position has moved by 3% of the authority. If not, the program is exited; but if so, steps 610 and 611 will disable the valve as described with respect to positive pressures hereinbefore.

The tests 607 and 613, to determine if there has been any stick position motion at all, need not be employed to practice the present invention; in such case, an affirmative result of test 606 could lead directly to test 609 and an affirmative result of test 612 could lead directly to test 614. With the elimination of those tests, the FAS fault determination of FIG. 6 is functionally identical to that of FIGS. 3 and 4.

Concerning all of the embodiments of FIGS. 3-6, the commonality is in having the direction and magnitude of change in stick position, following an excessive error between the actual pressure difference in the lines feeding the force actuator and the model force, determine a point when the direction and magnitude of stick position motion will begin to be monitored, the magnitude and direction of the change in stick position, when monitored, being selected by the direction of excessive pressure to determine whether there is a fault. The remaining variations in the embodiments may be used in cases where deemed appropriate, and not in others, singly or in various combinations.

The system illustrated in FIG. 1 incorporates redundant force command generators 22, 43a, and redundant position tranducers 24, 38 which provide an additional measure of safety. In any embodiments of the invention, various redundant circuitry may be used, or not, as is deemed appropriate, to provide additional reliability where desired, which is totally irrelevant to the practice of the present invention. A wide variety of circuit and-/or software variations may be employed, within the skill of the art, in the light of the teachings herein, which may differ in some respects from the disclosed embodiments, without altering the basics of the invention which is simply the utilization of directionally-assigned threshold detection of changes in stick motion following excessive force, and recognizing a threshold in either direction having been exceeded only if that corresponds to the same direction as an excessive force. Thus, although the invention has been shown and described with respect to exemplary embodiments thereof, it should be understood by those skilled in the art that the foregoing and various other changes, omissions and additions may be made thereto and therein, without departing from the spirit and the scope of the invention.

Having thus described typical embodiments of our invention, that which we claim as new and desire to secure by Letters Patent is:

1. An improved fault detector for a force feel system having an hydraulic actuator responsive to the difference in pressure of hydraulic fluid applied to opposite ends thereof through a turn-on valve to apply force in either of two directions to the control stick of an aircraft, the fault detector including:
   means for providing a desired force signal indicative of the force desired to be applied to the control stick by the actuator;
   means for providing an actual force signal indicative of the force applied by the actuator to the control stick;
   error means responsive to said desired force signal and said actual force signal for providing force error signals indicative of the magnitude and direction of the difference between the desired force and the actual force applied by said actuator;
   position means for providing control stick position signals indicative of the position of said control stick; and
   signal processing means connected to said position means and said error means, and responsive to the amount and direction of control stick motion, which occurs directly subsequent to said error means generating a signal indicative of an excessive force in either of said directions, for providing a fault signal to close said turn-on valve in response to excessive stick motion in the same direction as the direction of excessive force;
   in which the improvement in said signal processing means comprises means continually responsive to current ones of said control stick position signals for registering the control stick position indicated by said signals in response to said error means providing signals indicative of excessive force in either direction, to provide base position signals, for comparing said control stick position signals with said base position signals, for providing a first signal in response to said base position signals exceeding said current position signals by a threshold magnitude, for providing a second signal in response to said current position signals exceeding said base position signals by a threshold magnitude, and for generating said fault signal in response to said error means providing signals indicative of excessive force in a first direction concurrently with said first signal or in response to said error means providing signals indicative of excessive force in a second direction concurrently with said second signal.

2. The improvement according to claim 1 wherein said signal processing means includes:
   a pair of first threshold detectors responsive to said force error signals for providing signals indicative of excessive force in corresponding directions;
   a summing junction responsive to said control stick position signals;
   a track store circuit responsive to said control stick position signals and to said first threshold detectors for storing said control stick position signals in response to excessive force in either direction, the output of said track store circuit being applied to said summing junction;
   a pair of second threshold detectors responsive to the output of said summing junction; and
   means responsive to said first threshold detectors and to said second threshold detectors to provide said fault signal only upon concurrence of output from one threshold detector in each pair corresponding to the same direction.

3. The improvement according to claim 1 wherein said signal processing means includes:
   a plurality of reference registers;

a pair of first comparators, each responsive to said force error signals and a related one of said reference registers for providing signals indicative of excessive force in a corresponding direction;

a current register responsive to said control stick position signals for providing signals indicative of current stick positions;

a base register responsive to said control stick position signals and to said first comparators for storing said control stick position signals in response to excessive force in either direction;

a subtractor responsive to said current register and to said base register for providing signals indicative of the magnitude and direction of the difference in stick positions represented thereby;

a second comparator responsive to the output of said subtractor and a related one of said reference registers; and means responsive to said first comparators and to said second comparator to provide said fault signal only upon concurrence of output from said second comparator and the one of said first comparators corresponding in direction to the direction indicated by the signals provided by said subtractor.

4. The improvement according to claim 1 wherein said signal processing means comprises a digital computer programmed to compare said force error signals with threshold magnitudes of two different directions, to update a base position register whenever the threshold magnitudes of pressure error are not exceeded, to compare the difference between a current stick position and a position indicated by said base position register against a related position threshold of either of two different directions in the event that one of said pressure thresholds corresponding to the same direction is exceeded, and to provide said fault signal in the event that either one of said position thresholds is exceeded.

* * * * *